(12) United States Patent
Bertram et al.

(10) Patent No.: US 6,191,785 B1
(45) Date of Patent: Feb. 20, 2001

(54) METHOD AND SYSTEM FOR DYNAMICALLY MANIPULATING VALUES ASSOCIATED WITH GRAPHICAL ELEMENTS DISPLAYED WITHIN A GRAPHICAL USER INTERFACE

(75) Inventors: Randal Lee Bertram, Raleigh, NC (US); Mark Samuel Freeman, Lexington, KY (US)

(73) Assignee: International Business Machines Corporation, Armonk, NY (US)

(*) Notice: Under 35 U.S.C. 154(b), the term of this patent shall be extended for 0 days.

(21) Appl. No.: 08/982,609

(22) Filed: Dec. 2, 1997

(51) Int. Cl.[7] ........................................... G06F 3/14
(52) U.S. Cl. ................. 345/341; 345/339; 345/145; 345/123; 345/157
(58) Field of Search ..................... 345/341, 974, 345/349, 970, 145, 339, 348, 973, 123, 157

(56) References Cited

U.S. PATENT DOCUMENTS

| 4,772,882 | | 9/1988 | Mical | 340/709 |
|---|---|---|---|---|
| 4,896,291 | | 1/1990 | Gest et al. | 364/900 |
| 5,289,168 | | 2/1994 | Freeman | 345/121 |
| 5,327,528 | | 7/1994 | Hidaka et al. | 395/155 |
| 5,333,247 | | 7/1994 | Gest et al. | 395/138 |
| 5,339,391 | * | 8/1994 | Wroblewski et al. | 345/123 |
| 5,349,370 | | 9/1994 | Katayama et al. | 345/159 |
| 5,363,481 | | 11/1994 | Tilt | 395/156 |
| 5,506,951 | * | 4/1996 | Ishidawa | 345/348 |
| 5,528,259 | * | 6/1996 | Bates et al. | 345/341 |
| 5,553,225 | * | 9/1996 | Perry | 345/349 |
| 5,559,301 | * | 9/1996 | Bryan, Jr. et al. | 345/349 |
| 5,805,161 | * | 9/1998 | Tiphane | 345/341 |
| 5,828,374 | * | 10/1998 | Coleman et al. | 345/341 |

FOREIGN PATENT DOCUMENTS 63-205722   8/1988  (JP) ............................... G06F/3/023

* cited by examiner

Primary Examiner—Raymond J. Bayerl
Assistant Examiner—Thomas T. Nguyen
(74) Attorney, Agent, or Firm—Bernard D. Bogdon; Andrew J. Dillon (57) ABSTRACT

A method and system for dynamically manipulating values associated with graphical elements displayed within a graphic interface of a data-processing system. Initially a pointer element associated with a pointing device is displayed within the graphic interface, such that the pointer element is capable of movement in multiple directions in response to movement of the pointing device. A trackslide element and a moveable slider are displayed within the graphic interface. The moveable slider permits users to dynamically decrease or increase values associated with the trackslide element, such that the moveable slider is constrained to move only in a first direction along the trackslide element. The pointer element is then graphically attached to the moveable slider. Thereafter movement of the pointing device is translated into movement of the moveable slider in response to movement of the pointing device in the first direction while ignoring movement of the pointing device in the second direction, such that the moveable slider may be accurately and efficiently moved along the trackslide element without requiring the pointing device to be constrained to movement in a single direction.

18 Claims, 6 Drawing Sheets

METHOD AND SYSTEM FOR DYNAMICALLY MANIPULATING VALUES ASSOCIATED WITH GRAPHICAL ELEMENTS DISPLAYED WITHIN A GRAPHICAL USER INTERFACE

BACKGROUND OF THE INVENTION

1. Technical Field

The present invention relates in general to graphical user interfaces and in particular, to graphical user interface elements such as scrollbars. The present invention also relates to graphical pointing devices. More particularly, the present invention relates to trackpoint-type pointing devices. Still more particularly, the present invention relates to methods and systems for managing graphical pointing devices utilized in association with scrollbars displayed within graphical user interfaces.

2. Description of the Related Art

A graphical user interface is a type of display format which enables a user to choose commands, start programs, and see lists of files, objects and other options by pointing to pictorial representations and lists of menu items on a computer display screen. Choices can generally be activated by either a keyboard or a pointing device such as a mouse. A mouse is a commonly utilized pointing device, containing one or more buttons, that allows a user to interact with a product or operating environment through an associated graphical user interface.

Some conventional graphical user interfaces provide a cursor and scroll bar for scrolling through portions of a viewable object. A viewable object is an object that is the focus of a user's attention. A viewable object can contain multiple components such as spreadsheets, text, hotlinks, pictures, sound, and video objects. However, a viewable object is not limited to these components. In many types of graphical user interfaces, a vertical or horizontal bar at the side or bottom of a graphical user interface window can be utilized in conjunction with a pointing device such as a mouse, trackball, or stylus to move about in a viewable object. Scrolling permits viewing of any desired portion of a viewable object and is so named because it is the electronic equivalent of reading through a rolled (i.e., scrolled) viewable object rather than flipping through pages of a book. A vertical scroll bar is usually utilized to control up and down movement (e.g., through lines and pages of a viewable object), while a horizontal scroll bar controls movement across a viewable object.

Scrollbars are thus common graphical elements utilized in personal computer user interfaces (i.e., graphical user interfaces). A scrollbar adjusts a value along a range of possible values. Such scrollbars can be utilized to scroll a picture left or right on a display screen, or to adjust the color of an area on the screen, depending on the particular application to which the scrollbar is dedicated. Scrollbars are typically operated with a mouse or other pointing device. A user can utilize a pointing device to point a displayed cursor at the scrollbar, and then utilize a selection button displayed within the graphical user interface to manipulate the scrollbar via a so-called "click" of the pointing device. Many scrollbars include associated arrows for controlling the scrollbar. In some scrollbar applications, the user can click on a left arrow to decrease a value (i.e., numerical position or coordinates) by a small amount. If the user clicks on the arrow and holds down the pointing device button, then the value will continue decreasing until the button is released. Similarly, a right arrow can increase the value. The slider thus moves left and right as the value changes, in response to user input directed from the pointing device.

Scrollbars have several advantages. Scrollbars allow small, discrete increments and decrements to a value by "clicking" on arrows associated with the scrollbar. Scrollbars can also direct manipulation of a value by dragging the slider back and forth (or up and down depending on whether a user is dealing with a horizontally or vertically displayed scrollbar). Another important advantage associated with scrollbars is that such graphical elements display the current level of a value based on the position of the slider. Thus, scrollbars provide a visual indication of the status as well the means by which to alter the position of the slider.

An example of a pointing device which utilizes scrollbars to manipulate pictures or objects displayed within a graphical user interface is the IBM TrackPoint II™. The IBM TrackPoint II™ is a product of International Business Machines Corporation, located in Armonk, N.Y. The IBM TrackPoint II™ pointing device is commonly available on IBM ThinkPad™ products, which are also products of International Business Machines Corporation. This pointing device is composed of a lever located within a keyboard sych that the lever drives a mouse pointer about a display screen. Selection buttons correspond to mouse buttons. The buttons and the lever may be utilized in combination by the user so that the user can manipulate objects displayed on the display screen.

Several problems are associated with such pointing devices. One problem associated with such pointing devices is that it is more often difficult to "drag" an object utilizing such a pointing device than dragging an object with a mouse. If the selection button is separated from the lever, the user must hold the button and manipulate the lever simultaneously. This requires increased dexterity on the part of the user than simpler operations associated with a mouse, because the lever button and the selection button are two separate objects. Moreover, if the button is built into the TrackPoint lever, it may be mechanically impossible to perform a dragging operation. Even with a mouse, however, the technique of dragging is still difficult for many people to perform particularly beginning computer users.

Another problem associated with such pointing devices is that if the user "clicks" a side arrow and moves too far in a single direction, it is often difficult to switch directions. The user must switch from the selection button to the lever, move the pointer to the other arrow, and then switch back to the selection button, a time-consuming and difficult task. In some situations, an extreme level can result in serious problems. For example, in graphical user interfaces that display "audio" button controls based on sliders, if a user accidentally raises the volume too high, damage to equipment and human ears can occur while the user fumbles to turn the volume down. Thus, in many contexts, dragging a scrollbar slider is more appropriate than utilizing arrows associated with the scrollbars. However, many pointing devices, such as those described herein are simply not suitable for dragging.

Based on the foregoing, it can be appreciated that a need exists for a method and system in a graphical user interface which would allow a user to continue to use pointing devices while avoiding problems associated with scrollbars and such pointing devices.

SUMMARY OF THE INVENTION

It is therefore one object of the present invention to provide an improved graphical user interface method and system.

It is therefore another object of the present invention to provide an improved graphical user interface in which graphical elements such as scrollbars are displayed.

It is yet another object of the present invention to provide an improved method and system for managing the use of graphical pointing devices utilized in association with graphical elements displayed within graphical user interfaces.

It is still another object of the present invention to provide an improved trackpoint-type pointing device.

The above and other objects are achieved as is now described. A method and system for dynamically manipulating values associated with graphical elements displayed within a graphic interface of a data-processing system. Initially a pointer element associated with a pointing device is displayed within the graphic interface, such that the pointer element is capable of movement in multiple directions in response to movement of the pointing device. A trackslide element and a moveable slider are displayed within the graphic interface. The moveable slider permits users to dynamically decrease or increase values associated with the trackslide element, such that the moveable slider is constrained to move only in a first direction along the trackslide element. The pointer element is then graphically attached to the moveable slider. Thereafter movement of the pointing device is translated into movement of the moveable slider in response to movement of the pointing device in the first direction while ignoring movement of the pointing device in the second direction, such that the moveable slider may be accurately and efficiently moved along the trackslide element without requiring the pointing device to be constrained to movement in a single direction.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1A:
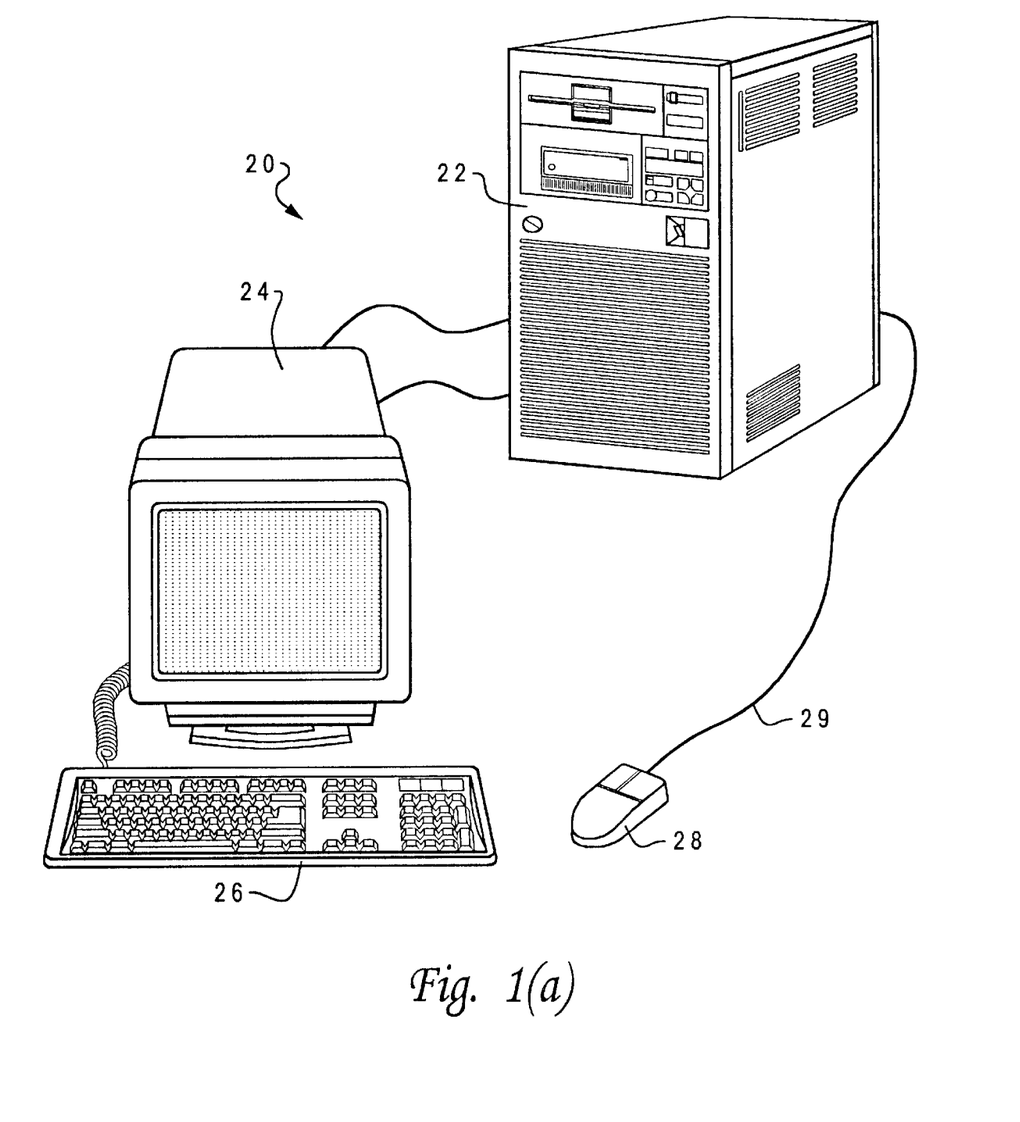
FIG. 1(a) illustrates a pictorial representation of a computer system in accordance with a preferred embodiment of the present invention.

With reference now to the figures and in particular with reference to FIG. 1(a), there is depicted a pictorial representation of a computer system in accordance with a preferred embodiment of the present invention. A computer system 20 is depicted that includes a system unit 22, a video display 24, a keyboard 26, and a mouse 28. Computer system 20 can be implemented utilizing any suitable computer such as the AS/400 computer system, IBM SYSTEM RISC/6000, or a personal computer. The AS/400 computer system and the IBM SYSTEM RISC/6000 are products of International Business Machines Corporation, located in Armonk, N.Y. Although the depicted embodiment ID involves a personal computer, a preferred embodiment of the present invention can be implemented in other types of data-processing systems, such as, for example, intelligent workstations, mini-computers,. or "notebook" computers such as the configuration depicted in FIG. 1(b) herein. Those skilled in the art will also appreciate, of course, that computer system 20 may also be implemented as a "laptop" or "notebook" computer, well known in the computer arts. Computer system 20 includes a graphical user interface that resides within a machine-readable media to direct the operation of computer system 20. Those skilled in the art will appreciate that the method and system of the present invention apply equally to any computer system, regardless of whether the computer system is a complicated multi-user computing apparatus or a single-user workstation.

Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display 24. Keyboard 26 includes a standard set of printable characters presented in a QWERTY pattern typical of most typewriters. In addition, keyboard 26 may include a calculator-like numeric keypad at one side and additional specialized keys. Some of these keys, such as the "Control," "cut," and "Shift" keys may be utilized to change the meaning of another key. Other special keys and combinations of keys can be utilized to control program operations or to move either text or cursor on the display screen of video display 24.

Mouse 28 is a commonly utilized pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. A cable 29 connects mouse 28 to a computer such as computer system 20. By moving mouse 28 on a surface (e.g, a desk surface or a mouse pad), the user typically controls an on-screen cursor. Such a mouse is a relative pointing device, because the mouse's movement is not defined by limitations, and also because its placement on a surface does not map directly to a specific location on a computer screen. Generally, to select items or choose commands on a screen displayed graphical user interface, the user presses one or more mouse buttons, producing a so-called mouse "click."

The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons. Although mouse 28 is described as a pointing device which may be utilized in accordance with a preferred embodiment of the present invention, those skilled in the art will appreciate that other pointing devices can also be utilized in association with a preferred embodiment of the present invention. One type of pointing device that may be utilized in association with a preferred embodiment is the IBM TrackPoint II™. Thus, mouse 28 is not a necessary feature of the present invention, but is presented for illustrative purposes only.

Figure 1B:
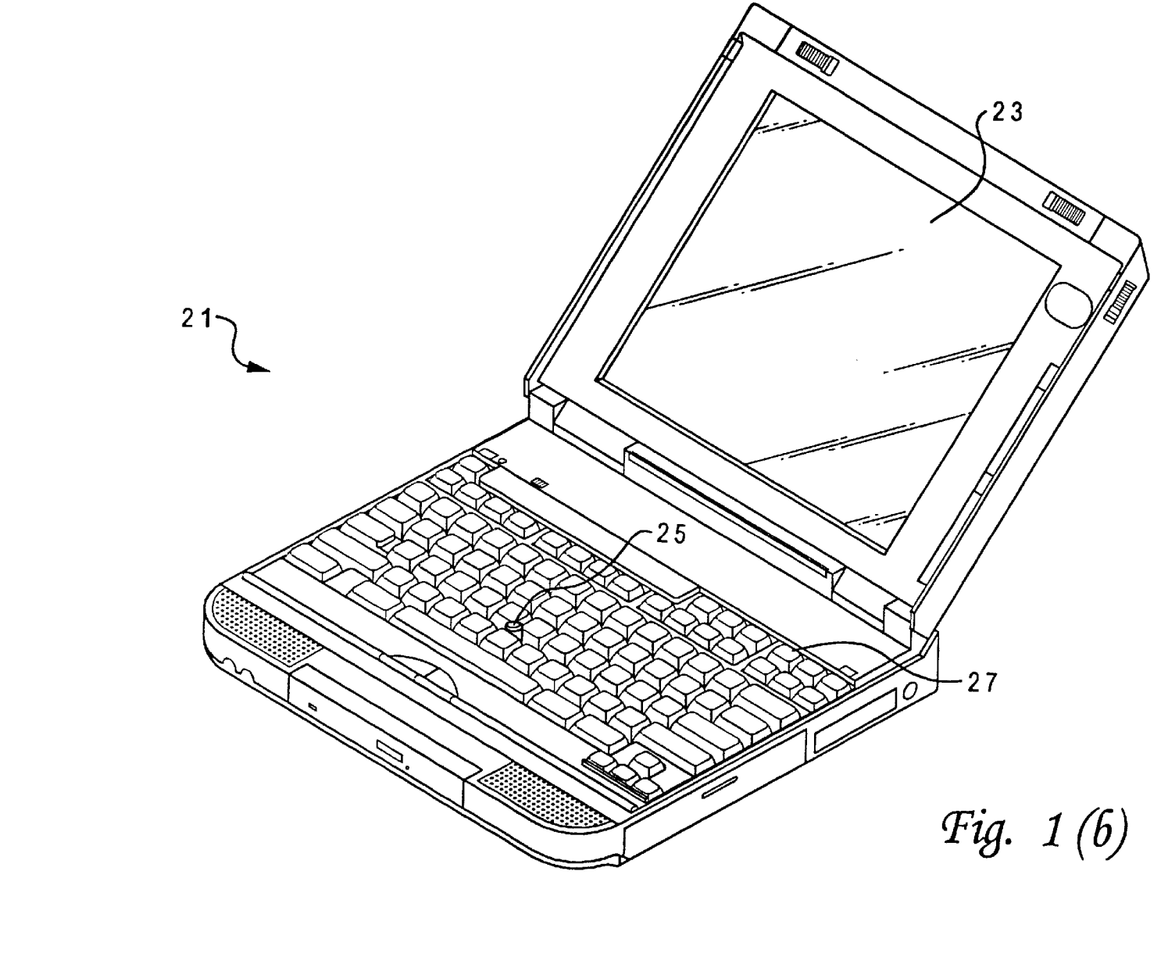
FIG. 1(b), is a pictorial representation of a notebook-based computer system, in accordance with an alternative preferred embodiment of the present invention.

FIG. 1(b), is a pictorial representation of a notebook-based computer system 21, in accordance with an alternative preferred embodiment of the present invention. Those skilled in the computer arts will appreciate that computer system 21 is a "notebook" or "laptop" version of computer system 20 depicted in FIG. 1(a). An example of a notebook-based implementation of computer system 21 includes the IBM ThinkPad™ product described herein. Computer system 21 includes a keyboard 27 which is analogous to keyboard 26 depicted in FIG. 1(a). Although not depicted in FIG. 1(b) a system unit analogous to system unit 22 is include internally within computer system 21. FIG. 1(b) further includes a video display 23 and a pointing device 25. Pointing device 25 is not a mouse. Instead, pointing device 25 may be implemented as an IBM TrackPoint II™ as described herein, or other notebook-based pointing devices well known in the computer arts.

Figure 2:
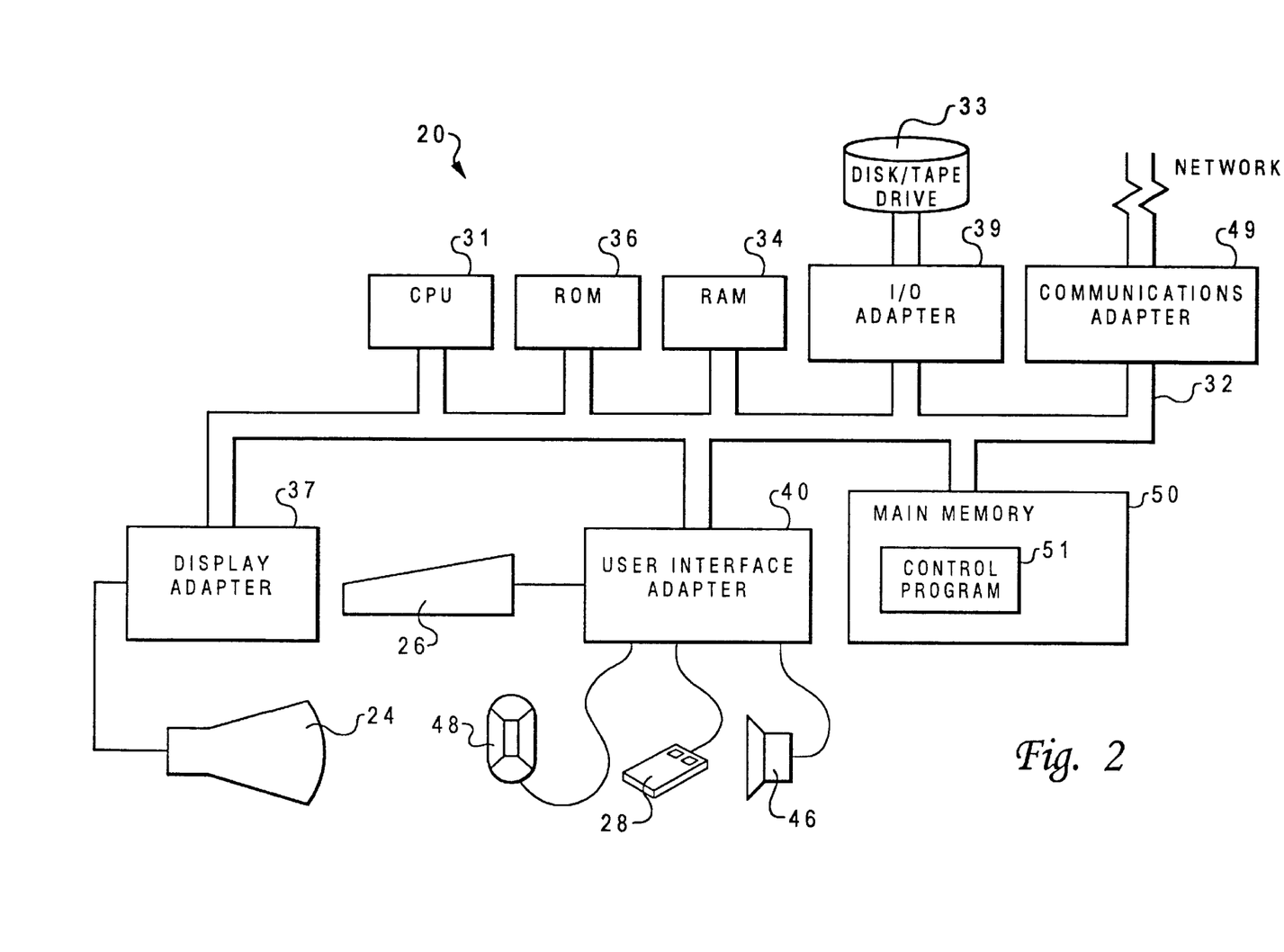
FIG. 2 depicts a representative hardware environment of a computer system in accordance with a the preferred embodiment of the present invention.

FIG. 2 depicts a representative hardware environment of a computer system in accordance with a preferred embodiment of the present invention. System unit 22 depicted in FIG. 1(a) includes a Central Processing Unit ("CPU") 31, such as a conventional microprocessor, and a number of other units interconnected via system bus 32. Computer system 20 includes random-access memory ("RAM") 34, read-only memory ("ROM") 36, display adapter 37 for connecting system bus 32 to video display 24, and I/O adapter 39 for connecting peripheral devices such as disk and tape drives 33 to system bus 32.

Disk and tape drives 33 are electromechanical devices that read from and write to disks. The main components of a disk drive include a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 20. A disk itself is typically a round, flat piece of flexible plastic (e.g., floppy disk) or inflexible metal (e.g. hard disk) coated with a magnetic material that can be electrically influenced to hold information recorded in digital (i.e., binary) form. A disk is, in most computers, the primary method for storing data on a permanent or semipermanent basis. Because the magnetic coating of the disk must be protected from damage and contamination, a floppy (e.g., 5.25 inch) disk or microfloppy (e.g., 3.5 inch) disk is encased in a protective plastic jacket. A hard disk, which is very finely machined, is typically enclosed in a rigid case and can be exposed only in a dust free environment.

Video display 24 is the visual output of computer system 20. Video display 24 can be, for example, a CRT-based video display well-known in the art of computer hardware. "CRT" is an acronym for cathode-ray tube. With a portable or notebook-based computer such as computer system 21 of FIG. 1(b), video display 24 can be replaced with an LCD-based or a gas plasma-based flat-panel display. "LCD" is an acronym for liquid crystal display. Those skilled in the art can thus appreciate that computer system 20 may be modified to be implemented as a notebook-based computer, such as computer system 21 depicted in FIG. 1(b). Computer system 20 further includes user interface adapter 40 for connecting keyboard 26, mouse 28, speaker 46, microphone 48, and/or other user interface devices, such as a touch screen device (not shown), to system bus 32. Communications adapter 49 connects computer system 20 to a computer network. Although computer system 20 is shown to contain only a single CPU and a single system bus, it should be understood that the present invention applies equally to computer systems that posses multiple CPUs and to computer systems that include multiple buses that each perform different functions in different ways.

Computer system 20 also includes a graphical user interface that resides within a machine-readable media to direct the operation of computer system 20, or as those skilled in the art will appreciate, computer system 21 depicted in FIG. 1(b). Any suitable machine-readable media may retain the graphical user interface, such as RAM 34, ROM 36, a magnetic diskette, magnetic tape, or optical disk (the last three being located in disk and tape drives 33). Any suitable operating system and associated graphical user interface (e.g., Microsoft Windows) may direct CPU 31. For example, the AIX operating system and AIXwindows windowing system (i.e., graphical user interface) can direct CPU 31. The AIX operating system is IBM's implementation of the UNIX operating system. UNIX is a trademark of UNIX Systems Laboratories, Inc. Other technologies can also be utilized in association with CPU 31, such as touch-screen technology or human voice control. Those skilled in the art will appreciate that the hardware depicted in FIG. 2 may vary for specific applications. For example, other peripheral devices such as optical disk media, audio adapters, or chip-programming devices, such as PAL or EPROM programming devices well-known in the art of computer hardware, and the like may be utilized in addition to or in place of the hardware already depicted.

Main memory 50 is connected to system bus 32, and includes a control program 51 that resides within main memory 50 and contains instructions that when executed on CPU 31, carry out the operations depicted in the logic flow chart described herein. The computer program product can also be referred to as a program product. It is important that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution.

Examples of signal-bearing media include: recordable-type media, such as floppy disks, hard disk drives and CD ROMs, and transmission-type media such as digital and analog communication links. Examples of transmission-type media include devices such as modems. A modem is a type of communications device that enables a computer to transmit information over a standard telephone line. Because a computer is digital (i.e., works with discrete electrical signals representative of binary 1 and binary 0) and a telephone line is analog (i.e., carries a signal that can have any of a large number of variations), modems can be utilized to convert digital to analog and vice-versa. The term "media" as utilized herein is a collective word for the physical material such as paper, disk, CD-ROM, tape and so forth, utilized for storing computer-based information.

Figure 3:
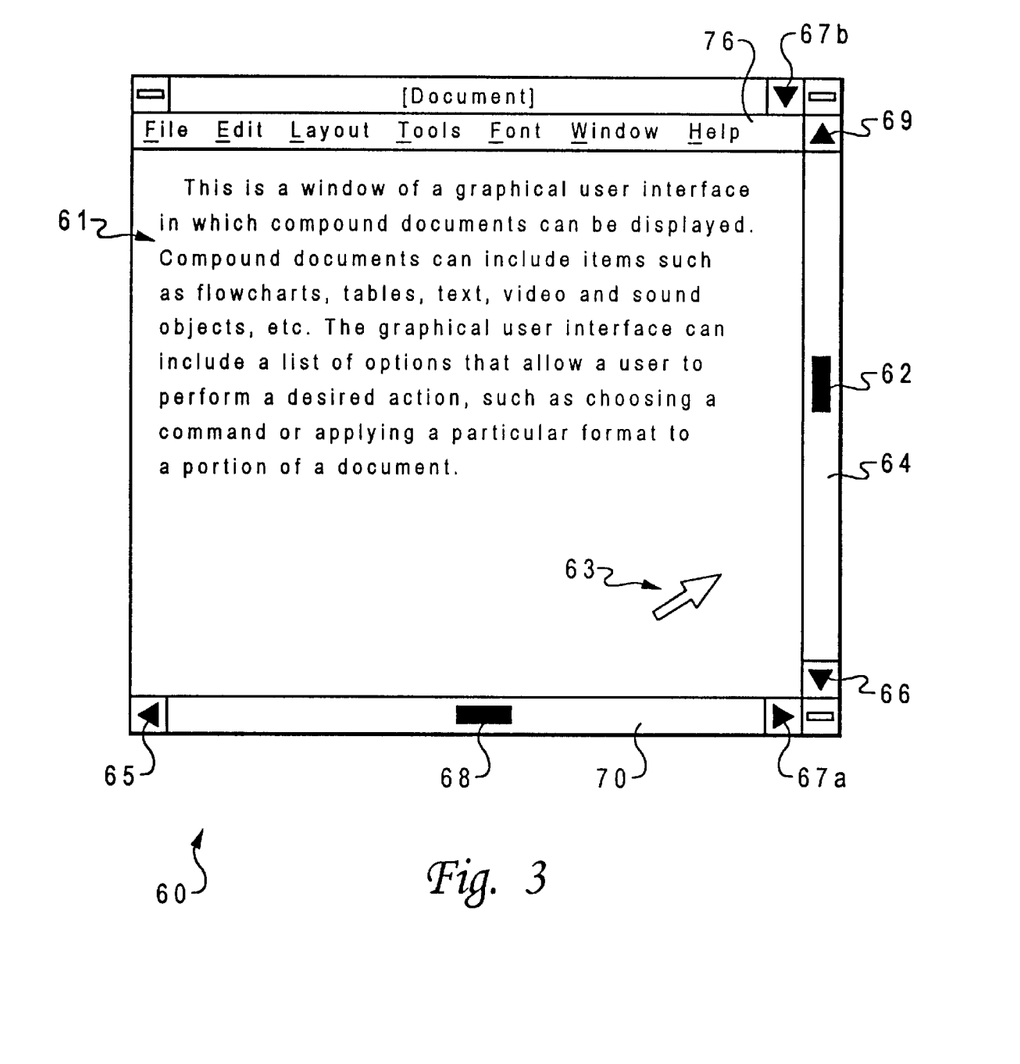
FIG. 3 illustrates a pictorial representation of a graphical user interface window in accordance with a preferred embodiment of the present invention.

FIG. 3 illustrates a pictorial representation of a graphical user interface window 60 in accordance with the method and system of the present invention. Window 60 displays a portion of a viewable object, such as a compound document 61. Window 60 is an area on the display screen of a visual display device such as video display 24 of FIG. 1(a) that is utilized to present a view of an object or to conduct a dialog with a user. Such "windows" can be utilized to present objects, action options, messages, and so forth.

Compound document 61 is a viewable object that can contain multiple components, such as spreadsheets, text, hotlinks, pictures, sound, and video objects. Examples of objects capable of running within the compound document include graphical representations, spreadsheets or a collection of text. In conventional graphical user interface window environments, a typical window displays a portion (e.g. a page) of a compound document. The size and position of the elevator within a window scroll bar corresponds to the size and position of the current viewable object in relation to the compound document. Because a compound document can include too large or too many objects to view simultaneously, the user can position a mouse cursor over an arrow section of the window scroll bar and click a pointing device (e.g. a mouse) to scroll the document upward or downward, as appropriate.

The size and position of slider 62 within scroll bar 64 corresponds to the size and position of the current viewable page in relation to compound document 61. The current viewable page is contained within a viewable window area within window 60. Window 60 also includes a menu bar 76. Menu bar 76 is a displayed rectangular bar from which menus can be selected by a user. Those skilled in the art will appreciate that compound document 61 is a document having multiple objects capable of running within the document such as spreadsheets, text, hotlinks, pictures, sounds, and video objects. Other examples of objects capable of running within a compound document such as computer document 61 include graphical representations, spreadsheets, or a collection of text. Names of available menus are displayed within menu bar 76. Choosing a particular menu in response to user input (e.g., mouse or keyboard user input) causes a list of options in the particular menu chosen to be displayed.

Because compound document 61 may include too many pages to view simultaneously, the user can position a cursor pointer 63 over up-arrow 69 or down-arrow 66 of scroll bar 64 and "click" a button on a pointing device such as a mouse to scroll the document upward or downward, as appropriate. Cursor pointer 63 is an on-screen element whose location changes as the user moves the pointing device. Depending on the location of cursor pointer 63 and the operation of the program with which its associated, the area of the screen where cursor pointer 63 appears serves as the target for an action when the user presses a button located on an appropriate pointing device, such as a mouse or a pointing device such as IBM TrackPoint II™ commonly available on IBM ThinkPad™ products. Scrolling in this manner permits viewing of any desired portion of compound document 61. Scrolling is essentially the electronic equivalent of reading through a rolled (i.e., "scrolled") document rather than flipping through pages of a book. Arrows 65, 67a and 67b can also be utilized by a graphical user interface user to scroll left or right through compound document 61. Scroll bar 64 is thus a graphical user interface window component, associated with a scrollable area, that indicates to a user that more information is available in a particular direction and can be scrolled into view.

In FIG. 3, the graphical user interface window 60 sizes slider 62 within scroll bar 64 according to the number of pages in compound document 61. The length of slider 62 is small with respect to the length of scroll bar 64 because it represents one of many pages of compound document 61. Similarly, the graphical user interface positions slider 62 within scroll bar 64 relative to the viewable position of compound document 61. For example, the graphical user interface positions slider 62 at the top of scroll bar 64 when the user is viewing the first page of compound document 61, and at the bottom of scroll bar 64 when the user is viewing the last page of compound document 61. Slider 62 on scroll bar 64 is defined to have a minimum size. Scrollbar 70 thus includes a slider 68 and associated arrows 65 and 67(a). Scrollbar 70 is a horizontal scrollbar while scrollbar 64 acts as a vertical scrollbar.

Figure 4:
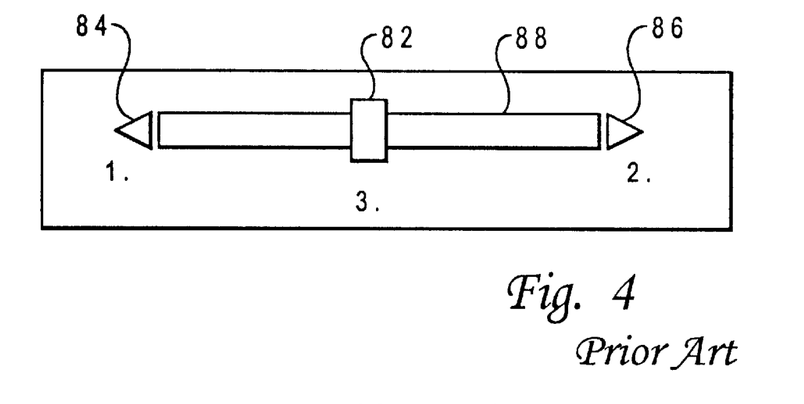
FIG. 4 is a pictorial diagram illustrative of a horizontal scrollbar.

FIG. 4 is a pictorial diagram illustrative of a prior art horizontal scrollbar 88. Scrollbar 88 is analogous to scrollbar 70 depicted in FIG. 3. A user operates scrollbar 88 by utilizing either left arrow 84 or right arrow 86 which are respectively analogous to left arrow 65 and right arrow 67(a) in FIG. 3. The use utilizes a pointing device to "click" on the left arrow to decrease a value by a small amount. This value can be, for example, the coordinate value of a position on the display screen, or a value associated with a volume control. These are merely illustrative examples to which such a value can be applied. If the user clicks on left arrow 84 and holds down a pointing device button, the value will continue decreasing until the button is released. Similarly, right arrow 86 increases the value. Slider 82 moves left and right according to how the value changes. The user can "click" on slider 82 and hold the pointing device button down while the slider moves back and forth across the scrollbar 88. Such an operation is referred to as a "dragging" operation. By dragging slider 82, the user can quickly move slider 82 to a desired position, easily moving it back and forth to "home in" on the desired value.

Figure 5A:
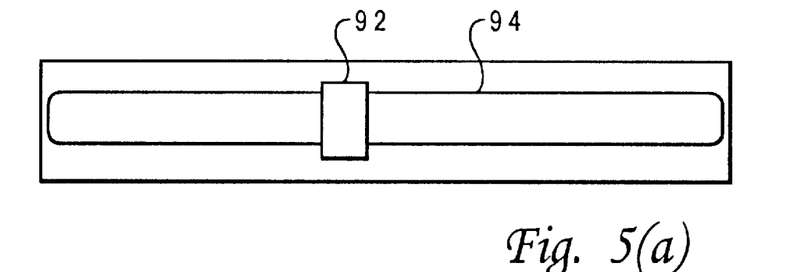
FIG. 5(a) is a pictorial diagram illustrative of a horizontal trackslider, in accordance with a preferred embodiment of the present invention.
Figure 5B:
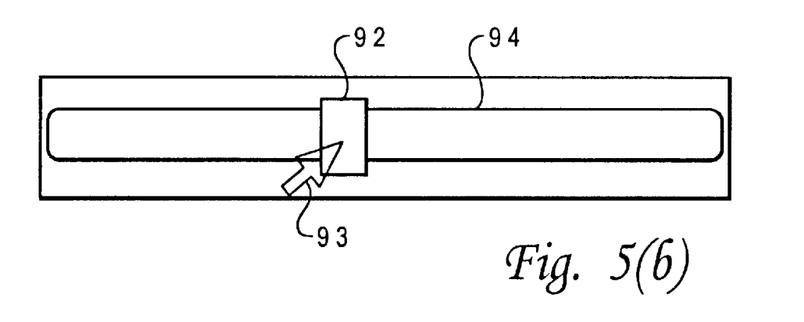
FIG. 5(b) is a pictorial diagram illustrative of a horizontal trackslider and a graphical pointer, in accordance with a preferred embodiment of the present invention.
Figure 5C:
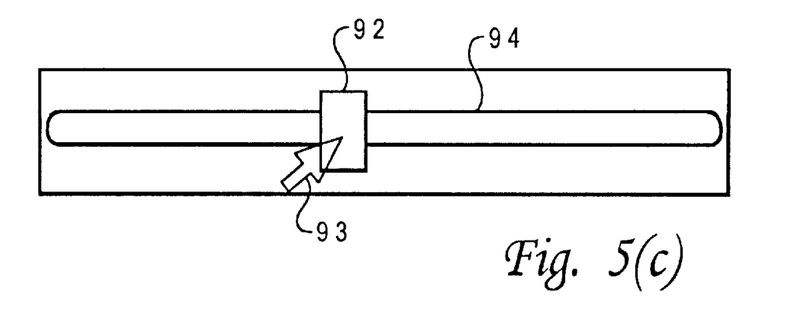
FIG. 5(c) is a pictorial diagram illustrative of an altered horizontal trackslider, in accordance with a preferred embodiment of the present invention.

FIG. 5(a) is a pictorial diagram illustrative of a horizontal trackslider 94, in accordance with a preferred embodiment of the present invention. When the user utilizes a pointing device to click on any point on trackslider 94, the graphical pointer (i.e., cursor pointer) associated with the pointing device becomes attached to slider 92 and changes shape and/or color to indicate that trackslider 94 is active. FIG. 5(b) is a pictorial diagram illustrative of a horizontal trackslider 94 and a graphical pointer 93 in accordance with a preferred embodiment of the present invention. FIG. 5(c) is a pictorial diagram illustrative of an altered horizontal trackslider 94, in accordance with a preferred embodiment of the present invention. In FIG. 5(a), FIG. 5(b), and FIG. 5(c) like parts are referenced by like reference numerals. Thus, those skilled in the art will appreciate that based on FIG. 5(a), FIG. 5(b), and FIG. 5(c), the user may move slider 92 back and forth by moving the pointer back forth with the pointing device.

Unlike a dragging operation, it is not necessary for the user to hold the pointing device button (i.e., selection button) down while slider 92 is being moved back and forth across trackslider 94. When slider 92 is moved to its desired position, the user clicks again to deactivate the trackslider. The graphical pointer becomes detached from slider 92 and returns to its normal shape and color. The altered trackslider 94 depicted in FIG. 5(c) is altered in shape and color (i.e., a narrower trackslider implementation and striped lines on the trackslider) to indicate that the trackslider 94 is active. Those skilled in the art will appreciate, of course, that in other preferred embodiments of the present invention, alteration of the trackslider may be accomplished by other techniques, such as enlarging the shape of the trackslider vertically or horizontally, or altering the shading (as opposed to the color) of the trackslider.

Figure 6:
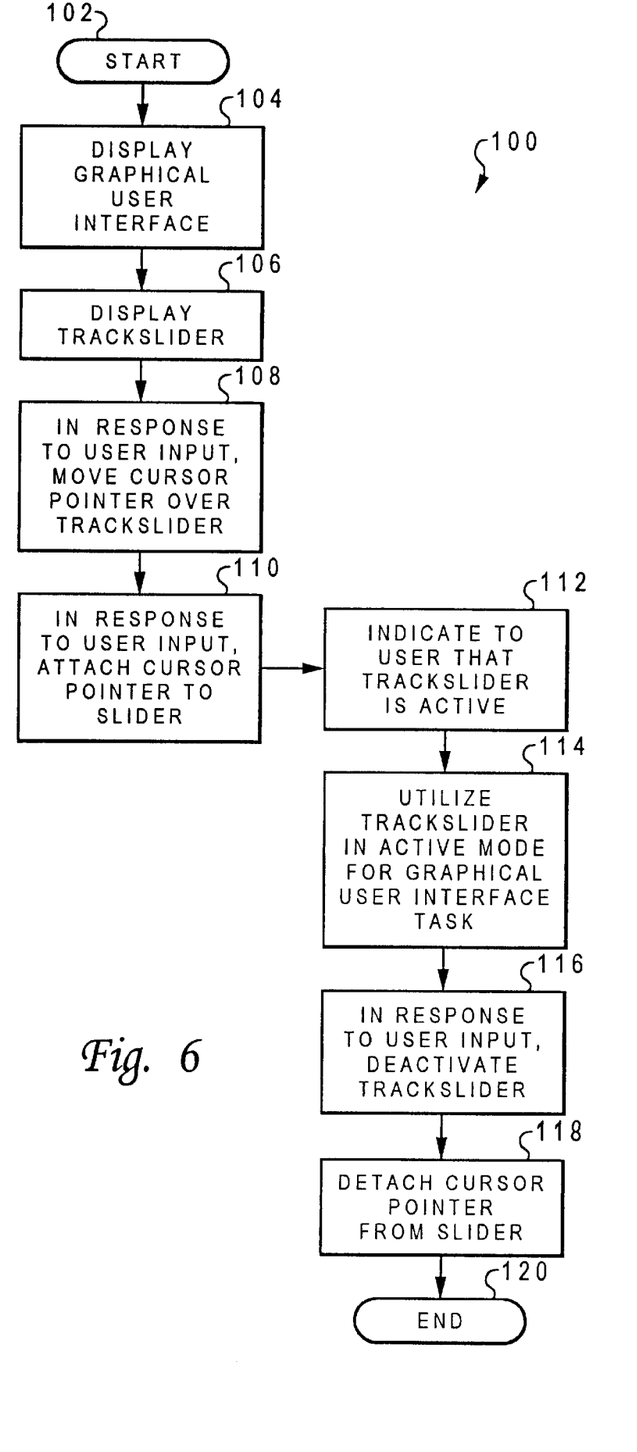
FIG. 6 is a flow diagram that shows steps utilized to carry out the method and system of the present invention, according to a preferred embodiment of the present invention.

FIG. 6 is a flow diagram 100 that shows steps utilized to carry out the method and system of the present invention, according to a preferred embodiment of the present invention. It can be appreciated by those skilled in the art that FIG. 6 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer system 20 and/or computer system 21 depicted in FIG. 1(a), FIG. 1(b), and FIG. 2, in processing electrical or other (e.g. mechanical, chemical) physical signals to generate other desired physical signals.

Thus, as indicated at block 102, the process is initiated. As described at block 104, the graphical user interface is displayed on-screen via a display such as video display 24 of FIG. 1(a) and/or video display 23 of FIG. 1(b). Those skilled in the art will appreciate that in a "laptop" or "notebook" implementation, the graphical user interface may be displayed on-screen via an appropriate laptop or notebook display. As illustrated at block 106, a trackslider is displayed within the graphical user interface environment. The trackslider operates according to the trackslider described in the text related to FIG. 5 herein (i.e., trackslider 94). As depicted at block 108, in response to user input, a cursor pointer is moved to and positioned over the trackslider. User input can include user input derived from a pointing device such as mouse 28 depicted in FIG. 1(a) and/or pointing device 25 depicted in FIG. 1(b) (e.g., the IBM TrackPoint II™ pointing device).

As illustrated at block 110, in response to user input, the cursor pointer becomes attached to a slider associated with the trackslider. The cursor pointer is analogous to cursor pointer 63 of FIG. 3. Thus, when the user "clicks" anywhere on the trackslider, the pointer becomes attached to the slider and as indicated at block 112, changes shape and/or color to indicate that the trackslider is active. At this point, as described at block 114, the user can utilize the trackslider in its active mode for graphical user interface tasks. The user may move the slider back and forth by moving the cursor pointer back and forth with the pointing device, which is an operation similar to dragging the slider on a scrollbar, except that the user does not hold the selection button down. The user does not have to worry about accidentally moving the cursor pointer off the slider because the cursor pointer is attached to the slider. As described at block 116, when the slider is in its desired position, the user "clicks" again the pointing device to active deactivate the slider. As indicated at block 118, the pointer is no longer attached to the slider and the slider returns to its normal shape and color. Thus, as depicted at block 120, the process is ended.

Those skilled in the art will appreciate that other embodiments of the present invention are also possible to implement. For example, an alternative embodiment of the present invention allows the user to deactivate the trackslider by moving the mouse directly up or down instead of sideways. In addition, those skilled in the art will appreciate that the trackslider can also be augmented with arrows on either side, similar to a scrollbar. The arrows are useful in situations where discrete changes are desired, such as scrolling through page numbers or television channels. However, in many situations the arrows are not appropriate and may even be dangerous (such as in the example of a volume control).

When the user clicks on a trackslider (i.e., activates a trackslider), the slider may jump to the cursor pointer's position or the pointer may jump to the trackslider's position. Such an implementation is of course, a matter of individual preference, depending upon a desired implementation of a preferred embodiment of the present invention. When a trackslider is activated, the screen may instruct the user to move the cursor pointer back and forth, and click again when finished to deactivate the trackslider. The function of a particular trackslider may be indicated by text located on-screen near the trackslider and/or a graphical picture inside the range of the slider. For example, a trackslider that adjusts brightness might contain a graphical picture that is dark on the left, bright on the right, and gray in the middle. Both scrollbars and tracksliders may be horizontal or vertical. This discussion is limited to horizontal tracksliders for illustrative purposes only. Keyboard support for tracksliders may be implemented by designating particular keys to activate the trackslider, move the slider back and forth, and so forth. Such keys may also be buttons located on a remote control device.

The embodiments and examples set forth herein are presented in order to best explain the present invention and its practical application and to thereby enable those skilled in the art to make and use the invention. However, those skilled in the art will recognize that the foregoing description and examples have been presented for the purposes of illustration and example only, and may be utilized in association with other graphical user interface elements, objects and functions, not scrollbars. From the foregoing, those skilled in the art can appreciate that the description as set forth is not intended to be exhaustive or to limit the invention to the precise form disclosed. Many modifications and variations are possible in light of the above teaching without departing from the spirit and scope of the following claims.

What is claimed is:

1. A method for dynamically manipulating values associated with graphical elements displayed within a graphic interface of a data-processing system, comprising the steps of:

displaying with said graphic interface, a pointer element associated with a pointing device, wherein said pointer element is capable of moving in multiple directions in response to movement of said pointing device;

display within said graphic interface, a trackslide element and a moveable slider that permits users to dynamically decrease or increase values associated with said trackslide element, such that said moveable slider is consumed to move only in a first direction along said trackslide element;

graphically attaching, in response to user input, said pointer element to said moveable slider and graphically altering an appearance of said trackslide element in response to said attaching; and thereafter translating movement of said pointing device into movement of said moveable slider in response to movement of said pointing device in said first direction while ignoring movement of said point device in other directions, such that said moveable slider may be accurately and efficiently moved along said trackslide element without requiring said pointing device to be constrained to movement in a single direction.

2. The method of claim 1 wherein the step of displaying within said graphic interface, a pointer element associated with a pointing device, wherein said pointer element is capable of moving in both a first direction and a second direction in response to movement of said pointing device, further comprises the step of:

displaying within said graphic interface, a pointer element associated with a pointing device, wherein said pointer element is capable of moving in both a first direction and a second direction in response to movement of said pointing device, such that said pointer element possesses a shape and color.

3. The method of claim 2 further comprising the step of:

indicating to said users that said pointer element is graphically attached to said moveable slider by graphically altering said shape of said pointer element.

4. The method of claim 3 further comprising the step of:

indicating to said users that said pointer element is graphically attached to said moveable slider by graphically altering said color of said pointer element.

5. The method of claim 4 wherein the step of displaying within said graphic interface, a trackslide element and a moveable slider that permits users to dynamically decrease or increase values associated with said trackslide element, such that said moveable slider is constrained to move only in a first direction along said trackslide element, further comprises the step of:

displaying within said graphic interface, a trackslide element and a moveable slider that permits users to dynamically decrease or increase values associated with said trackslide element, such that said moveable slider is constrained to move only in a first direction along said trackslide element; and wherein said trackslide element comprises a trackslider.

6. A system for dynamically manipulating values associated with graphical elements displayed within a graphic interface of a data-processing system, comprising:

means for displaying with said graphic interface, a pointer element associated with a pointing device, wherein said pointer element is capable of moving in multiple directions in response to movement of said pointing device;

means for displaying within said graphic interface, a trackslide element and a moveable slider that permits users to dynamically decrease or increase values associated with said trackslide element, such that said moveable slider is constrained to move only in a first direction along said trackslide element;

means for graphically attaching, in response to user input, said pointer element to said moveable slider and graphically altering an appearance of said trackslide element in response to said attaching; and means for thereafter translating movement of said pointing device into movement of said moveable slider in response to movement of said pointing device in said first direction while ignoring movement of said pointing device in other directions, such that said moveable slider may be accurately and efficiently moved along said trackslide element without requiring said pointing device to be constrained to movement in a single direction.

7. The system of claim 6 wherein said pointer element possesses a shape and color.

8. The system of claim 7 further comprising means for indicating to said users that said pointer element is graphically attached to said moveable slider by graphically altering said shape of said pointer element.

9. The system of claim 8 further comprising means for indicating to said users that said pointer element is graphically attached to said moveable slider by graphically altering said color of said pointer element.

10. The system of claim 9 wherein said trackslide element comprises a trackslider.

11. A program product residing in computer memory in a computer system for dynamically manipulating values associated with graphical elements displayed within a graphic interface of a data processing system, comprising:

instruction means residing in a computer system for displaying within said graphic interface, a pointer element associated with a pointing device, wherein said pointer element is capable of moving in multiple directions in response to movement of said pointing device;

instruction means residing in a computer system for displaying within said graphic interface, a trackslide element and a moveable slider that permits users to dynamically decrease or increase values associated with said trackslide element, such that said moveable slider is constrained to move only in a first direction along said trackslide element;

instruction means residing in a computer system for graphically attaching, in response to user input, said pointer element to said moveable slider and graphically altering an appearance of said trackslide element in response to said attaching; and instruction means residing in a computer system for thereafter translating movement of said pointing device into movement of said moveable slider in response to movement of said pointing device in said first direction while ignoring movement of said pointing device in other directions, such that said moveable slider may be accurately and efficiently moved along said trackslide element without requiring said pointing device to be constrained to movement in a single direction.

12. The program product of claim 11 wherein said pointer element possesses a shape and color.

13. The program product of claim 12 further comprising instruction means residing in a computer system for indicating to said users that said pointer element is graphically attached to said moveable slider by graphically altering said shape of said pointer element.

14. The program product of claim 13 further comprising instruction means residing in a computer system for indicating to said users that said pointer element is graphically attached to said moveable slider by graphically altering said color of said pointer element.

15. The program product of claim 14 wherein said trackslide element comprises a trackslider.

16. The program product of claim 15 wherein each of said instruction means further comprises signal bearing media.

17. The program product of claim 16 wherein said signal bearing media further comprises recordable media.

18. The program product of claim 16 wherein said signal bearing media further comprises transmission media.

* * * * *